_United States Patent Office_

3,226,383
Patented Dec. 28, 1965

3,226,383
21-DESOXY-16,17-CYCLIC ACETALS
Howard J. Ringold and Carl Djerassi, Mexico City, Mexico, assignors, by mesne assignments, to Syntex Corporation, a corporation of Panama
No Drawing. Filed Apr. 28, 1960, Ser. No. 25,236
Claims priority, application Mexico, May 18, 1959, 54,598, 54,599
19 Claims. (Cl. 260—239.55)

The present invention relates to novel cyclopentanophenanthrene derivatives.

More particularly the present invention relates to cyclic 16α, 17α-ketals and 16α, 17α-acetals of 6α-halo (fluoro or chloro)-9α-halo(fluoro or chloro)-Δ⁴-pregene-16α, 17α-diol-3,20-diones having an oxygen function such as keto or β-hydroxy at C–11. Moreover, there may be present in the molecule double bonds at C–1,2 and/or C–6,7.

The novel compounds of the present invention have anti-androgenic activity, anti-estrogenic activity and exhibit a marked anti-inflammatory activity particularly upon topical administration.

The novel compounds of the present invention are illustrated by the following formulas:

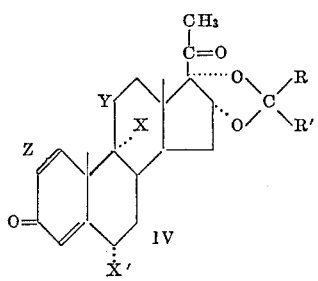

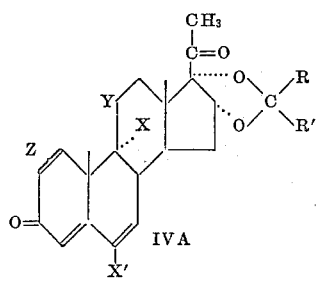

In the above formulas, Z indicates a double bond or a saturated linkage between C–1 and C–2; X and X′ represent chlorine or fluorine; Y represents keto or β-hydroxyl and R and R′ represent hydrogen or the residue of a hydrocarbon radical containing up to 8 carbon atoms of straight, branched, cyclic or mixed aliphatic-cyclic chain, saturated or unsaturated, including aromatic groups.

The new compounds IV of the present invention wherein X′ is fluorine may be prepared by a process illustrated by the following equations:

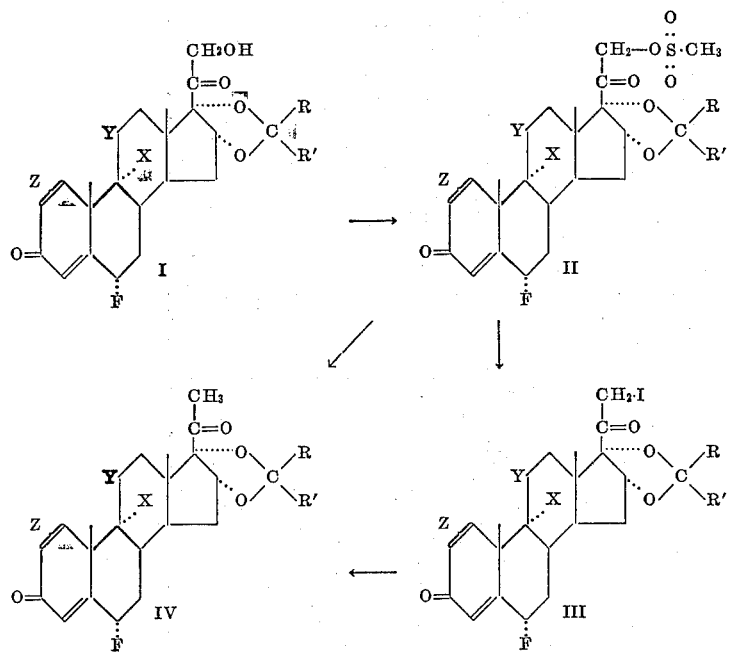

In the above equation X, Y, Z, R and R' have the same meaning as heretofore set forth.

When a 6-dehydro or 1,6-bisdehydro compound is utilized as the starting compound, the following equation serves to illustrate the course of the reaction:

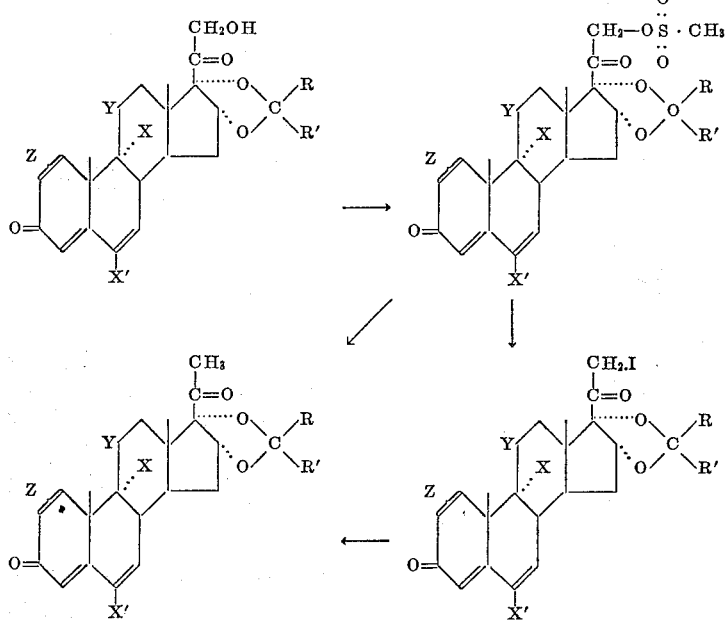

In the above reaction X, X', Y, Z, R and R' have the same meaning as previously set forth.

For transforming the 17β-ketol side chain of the starting compounds into the 17β-acetyl group, that is, for producing the desired final products, there was first formed the 21-mesylate (II) by reaction with methanesulfonyl chloride in pyridine, the mesylate group was then substituted by iodine by reaction with sodium iodide in mixture with acetone, and finally the resulting 21-iodo compound (III) was transformed into the 17β-acetyl-compound (IV) by refluxing with sodium bisulfite in mixture with aqueous methanol, or by reaction with chromous chloride in acetone.

However, where the starting compound contained the 6-chloro-Δ⁴-3-keto grouping, it was first necessary to protect the chlorine atom at C-6 prior to transformation of the 17-ketol side chain into the 17β-acetyl group. This was accomplished by reacting the 16α, 17α-cyclic ketal or 16α, 17α-cyclic acetal derivative of 6(α or β)-chloro-9α-halo-16α-hydroxy-cortisone 21-acetate or of 6(α or β)-chloro-9α-halo-16α-hydroxy-hydrocortisone 21-acetate with ethyl orthoformate at room temperature for 1 hour in a solvent such as dioxane and in the presence of p-toluenesulfonic acid to form the 3-ethyl enol ether derivative. The C-21 acetoxy group was then hydrolyzed as by treatment with 1% methanolic potassium hydroxide at 0° C. and the resulting 21-hydroxy compound was then transformed into the 21-mesylate, the 21-iodo and finally the 21-desoxy compound as hereinabove set forth. Upon subsequent treatment with a mineral acid, such as dilute hydrochloric acid in acetic acid, at room temperature, the enol ether group was hydrolyzed to regenerate the Δ⁴-3-keto group, thus affording the corresponding 16α, 17α-cyclic acetal or ketal of 6α-chloro-9α-halo(fluoro or chloro)-Δ⁴-pregnene compound. A double bond may then be introduced at C-1,2 by refluxing with selenium dioxide, preferably in tertiary butanol, in the presence of pyridine and under an atmosphere of nitrogen for 48 hours or a double bond may be introduced at C-6,7 by refluxing with chloranil preferably in mixture with ethyl acetate and acetic acid or in mixture with xylene or tertiary butyl alcohol. By a combination of these methods or by refluxing the Δ⁴-compound with chloranil in n-amyl alcohol, there was obtained the $\Delta^{1,4,6}$-trienes.

Protection of the chlorine atom at C-6 was not necessary when the 6-dehydro or 1,6-bisdehydro compound served as the starting compound.

The preparation of the novel compounds IV of the present invention wherein X' is chlorine may be illustrated by the following reaction equation:

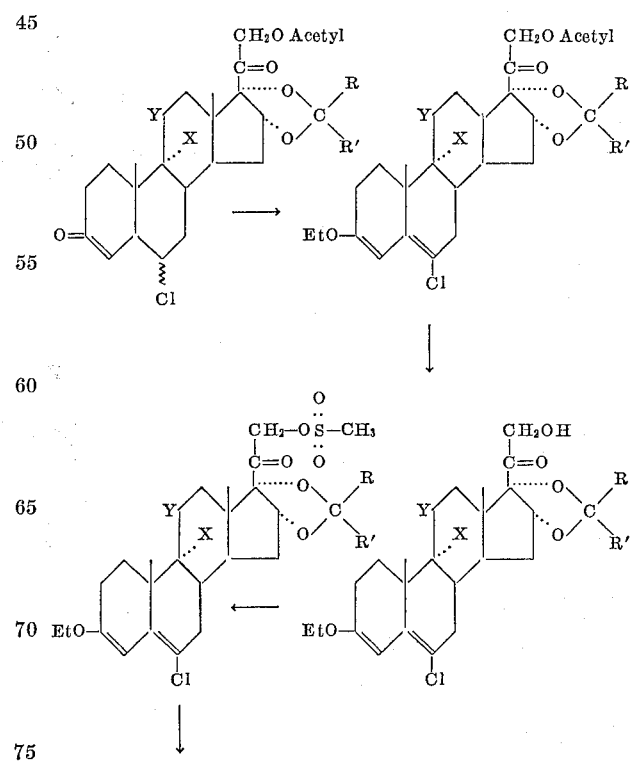

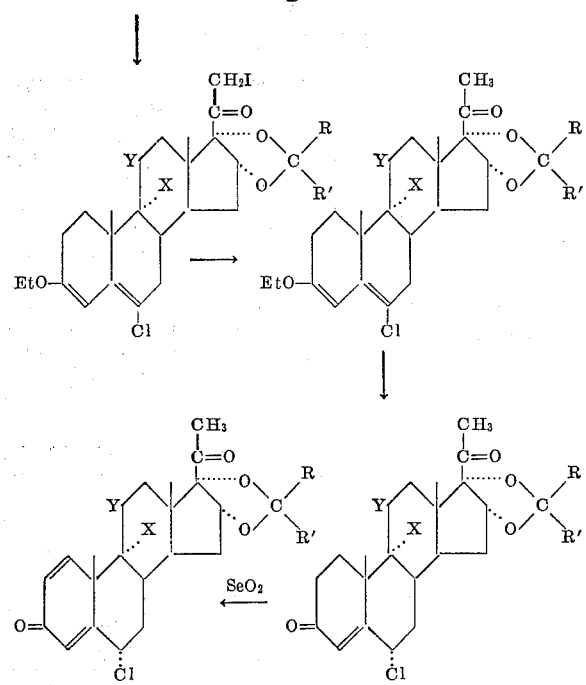

In practicing the process according to the above reactions, there were used as starting materials the 16α,17α-cyclic ketals or 16α,17α-cyclic acetals of 6-halo(fluoro or chloro)-9α-halo-(fluoro or chloro)-11-(keto or β-hydroxy)-Δ⁴-pregnene-16α,17α-diol-3,20-diones and their 1-dehydro derivatives, disclosed in copending application Serial No. 819,545 filed on June 11, 1959, now Patent No. 3,126,375, and the 6-dehydro derivatives thereof as hereinafter more fully described.

The starting compounds utilized for the preparation of the novel compounds of the present invention, disclosed in the aforementioned copending application, were obtained by treatment of a 6α-halo (fluoro or chloro)-9α-halo (fluoro or chloro)-16α-hydroxy derivative of cortisone, hydrocortisone, prednisone or prednisolone or the 21-esters thereof, disclosed in copending application Serial No. 762,232, filed September 22, 1958 and Serial No. 753,626, filed August 7, 1958, now Patent No. 2,997,489, with an aldehyde or ketone such as formaldehyde, paraldehyde, acetaldehyde, benzaldehyde, acetophenone, methyl ethyl ketone, diethyl ketone, furfural, chloracetone and the like under anhydrous conditions and in the presence of a catalyst such as copper sulphate, dry hydrogen chloride or perchloric acid without using a solvent or in the presence of a solvent such as dioxane. The C-21-ester group was hydrolyzed by reaction with sodium methoxide in methanol solution at low temperature under an atmosphere of nitrogen and under anhydrous conditions to thus afford the 16α,17α-cyclic acetals or 16α,17α-cyclic ketals of the 6α-halo-9α-halo-16α-hydroxy derivatives of cortisone, hydrocortisone, prednisone and prednisolone.

For the preparation of the starting 6-dehydro compounds, a 21-ester of the latter compounds was heated with chloranil in xylene. However, upon heating with chloranil in n-amyl alcohol, the cortisone and hydrocortisone derivatives were transformed into the corresponding 1,6-bisdehydro compounds; the latter compounds were also formed from the corresponding 6-dehydro derivatives by refluxing with selenium dioxide in tertiary butanol and in the presence of catalytic amounts of pyridine.

The reactions may be modified within wide limits both with respect to the reagents and solvents employed as with respect to the conditions of temperature and time. Thus for example, instead of 21-mesylate, there was prepared the 21-tosylate; a 21-alkyl(aryl)-sulfonate may be converted in only one step into the desired 21-desoxy compound by refluxing with sodium iodide in mixture with acetic acid.

The following examples serve to illustrate but are not intended to limit the scope of the invention:

EXAMPLE I

A solution of 3 g. of 16α,17α-acetonide of 6α,9α-difluoro-16α-hydroxy cortisone, described in copending application Serial No. 819,545, in 60 cc. of a mixture of pyridine and chloroform (9:1) was cooled to 0° C. Under stirring, there was added batchwise 1.0 g. of methanesulfonyl chloride; the mixture was kept for 14 hours at 0° C., diluted with 60 cc. of chloroform, washed with dilute hydrochloric acid, water, aqueous sodium bicarbonate solution and again with water, dried over anhydrous sodium sulfate and the solvent was evaporated under reduced pressure. Thus there was obtained the crude 21-mesylate of 16α,17α-acetonide of 6α,9α-difluoro-16α-hydroxy cortisone.

A solution of the crude compound in 120 cc. of acetone was treated with 2 g. of sodium iodide and refluxed for 2 hours. Most of the acetone was removed by distillation, the residue was diluted with water and the precipitate formed was collected by filtration, washed with water and dried under vacuum. There was thus obtained the crude 16α,17α-acetonide of 6α,9α-difluoro-21-iodo-Δ⁴-pregnene-16α,17α-diol-3,11,20-trione.

To a solution of this iodo compound in 120 cc. of methanol and 12 cc. of water was added 3 g. of sodium bisulfite and and mixture was refluxed for 2 hours. Most of the methanol was removed by distillation under reduced pressure, the residue was diluted with water and the precipitate was collected, washed with water, dried and recrystallized from acetone-hexane. There was thus obtained the 16α,17α-acetonide of 6α,9α-difluoro-Δ⁴-pregnene-16α,17α-diol-3,11,20-trione.

EXAMPLE II

By the method of Example I, but employing p-toluenesulfonyl chloride instead of methanesulfonyl chloride, there was prepared the 21-tosylate of 16α,17α-acetonide of 6α,9α-difluoro-16α-hydroxy-cortisone.

A solution of 2.0 g. of the above compound in 100 cc. of glacial acetic acid was treated with 6.5 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane, there was obtained the 16α,17α-acetonide of 6α,9α-difluoro-Δ⁴-pregnene-16α,17α-diol-3,11,20-trione, identical with the one prepared in accordance with Example I.

EXAMPLE III

A mixture of 5 g. of 16α,17α-acetonide of 6α,9α-difluoro-16α-hydroxy-cortisone 21-acetate, 8 g. of chloranil and 200 cc. of xylene was refluxed for 12 hours, cooled and diluted with ether. The solution was washed with water, 5% sodium carbonate solution and again with water to neutral, dried over anhydrous sodium sulfate and evaporated to dryness under reduced pressure. By chromatography of the residue on neutral alumina, there was obtained the 16α,17α-acetonide of 6,9α-difluoro-16α-hydroxy-6-dehydro-cortisone 21-acetate.

A suspension of 1 g. of the 16α,17α-acetonide of 6α,9α-difluoro-16α-hydroxy-6-dehydro-cortisone 21-acetate in 10 cc. of absolute methanol was treated with 10 cc. of sodium methoxide in absolute methanol (prepared by dissolving 60 mg. of sodium metal in 10 cc. of absolute methanol), with stirring under an atmosphere of nitrogen at 0° C. for 1 hour. After precipitating with saturated aqueous sodium chloride solution containing a few drops of acetic acid, the product was extracted with methylene chloride, washed with water, dried over anhydrous sodium sulfate and evaporated. The residue was recrystallized from acetone-hexane, thus affording the free 16α,17α-acetonide of 6,9α-difluoro-16α-hydroxy-6-dehydro-cortisone.

In accordance with the methods described in Examples I and II, the 16α,17α-acetonide of 6,9α-difluoro-16α-hydroxy-6-dehydro-cortisone were converted into the 16α,17α-acetonide of 6,9α-difluoro-Δ$^{4,6}$-pregnadiene-16α,17α-diol-3,11,20-trione.

A mixture of 2 g. of the 16α,17α-acetonide of 6α,9α-difluoro-16α-hydroxy-6-dehydro-cortisone, 100 cc. of tertiary butanol, 300 mg. of selenium dioxide and 0.2 cc. of pyridine was refluxed under an atmosphere of nitrogen for 48 hours, filtered through celite and the filtrate was evaporated to dryness under reduced pressure. The residue was refluxed for 1 hour with decolorizing charcoal in acetone, filtered from the charcoal and the filtrate was evaporated to dryness. Chromatography of the residue on washed alumina yielded the 16α,17α-acetonide of 6,9α-difluoro-16α-hydroxy-1,6-bisdehydro-cortisone which was then converted into the 16α,17α-acetonide of 6,9α-difluoro-Δ$^{1,4,6}$-pregnatriene-16α,17α-diol-3,11,20-trione by the method described in Example I.

EXAMPLE IV

In accordance with the methods described in Examples I and II, the 16α,17α-methyl-phenyl ketal of 6α,9α-difluoro-16α-hydroxy-hydrocortisone, described in copending application, Serial No. 819,545, was converted into the 16α,17α-methyl-phenyl ketal of 6α,9α-difluoro-Δ$^4$-pregnene-11β,16α,17α-triol-3,20-dione.

In accordance with the methods described in Examples I and II, the 16α,17α-acetonides of the compounds listed under A and described in the aforementioned copending application were converted into the 16α,17α-acetonides of the compounds listed under B.

| Ex. | A | B |
|---|---|---|
| V | 6α-fluoro-9α-chloro-16α-hydroxy-cortisone. | 6α-fluoro-9α-chloro-Δ$^4$-pregnene-16α,17α-diol-3,11,20-trione. |
| VI | 6α-fluoro-9α-chloro-16α-hydroxy-hydrocortisone. | 6α-fluoro-9α-chloro-Δ$^4$-pregnene-11β,16α,17α-triol-3,20-dione. |
| VII | 6α-fluoro-9α-chloro-16α-hydroxy-prednisone. | 6α-fluoro-9α-chloro-Δ$^{1,4}$-pregnadiene-16α,17α-diol-3,11,20-trione. |
| VIII | 6α-fluoro-9α-chloro-16α-hydroxy-prednisolone. | 6α-fluoro-9α-chloro-Δ$^{1,4}$-pregnadiene-11β,16α,17α-triol-3,20-dione. |
| IX | 6α,9α-difluoro-16α-hydroxy-hydrocortisone. | 6α,9α-difluoro-Δ$^4$-pregnene-11β,16α,17α-triol-3,20-dione. |
| X | 6α,9α-difluoro-16α-hydroxy-prednisone. | 6α,9α-difluoro-Δ$^{1,4}$-pregnadiene-16α,17α-diol-3,11,20-trione. |
| XI | 6α,9α-difluoro-16α-hydroxy-prednisolone. | 6α,9α-difluoro-Δ$^{1,4}$-pregnadiene-11β,16α,17α-triol-3,20-dione. |

EXAMPLE XII

In accordance with the method described in Example III, the starting compounds of Example V through XI were converted into the corresponding 6-dehydro compounds and then by the methods described in Examples I and II were finally converted into the corresponding 21-desoxy-16α,17α-acetonide derivatives, i.e., the 16α,17α-acetonides of 6-fluoro-9α-chloro-Δ$^{4,6}$-pregnadiene-16α,17α-diol-3,11,20-trione;

6-fluoro-9α-chloro-Δ$^{4,6}$-pregnadiene-11β,16α,17α-triol-3,20-dione;

6-fluoro-9α-chloro-Δ$^{1,4,6}$-pregnatriene-16α,17α-diol-3,11,20-trione;

6-fluoro-9α-chloro-Δ$^{1,4,6}$-pregnatriene-11β,16α,17α-triol-3,20-dione;

6,9α-difluoro-Δ$^{4,6}$-pregnadiene-11β,16α,17α-triol-3,20-dione;

6,9α-difluoro-Δ$^{1,4,6}$-pregnatriene-16α,17α-diol-3,11,20-trione (identical with the one produced in Example III), and 6,9α-difluoro-Δ$^{1,4,6}$-pregnatriene-11β,16α,17α-triol-3,20-dione.

EXAMPLE XIII

A mixture of 5 g. of the 21-acetate of the 16α,17α-acetonide of 6α-chloro-9α-fluoro-16α-hydroxy-cortisone, 5 cc. of ethyl orthoformate, 50 cc. of dioxane and 500 mg. of p-toluenesulfonic acid monohydrate was stirred at room temperature for 1 hour, 5.0 cc. of pyridine was then added followed by the portionwise addition of ice water, under stirring and until complete precipitation of the reaction product. The mixture was kept in the refrigerator for 2 hours and the precipitate was collected by filtration, washed with water, dried and recrystallized from acetone-hexane; there was thus obtained the 16α,17α-acetonide of 6 - chloro - 9α - fluoro - 3 - ethoxy - 21 - acetoxy - Δ$^{3,5}$-pregnadien-16α,17α-diol-11,20-dione, namely the 3-ethyl-enol-ether of the 21-acetate of the 16α,17α-acetonide of 6-chloro-9α-fluoro-16α-hydroxy-cortisone.

In order to obtain the enol ether compound with the free 21-hydroxyl group, the steroid was treated with 1% methanolic potassium hydroxide solution for 1 hour at 0° and under an atmosphere of nitrogen, using 50 cc. of the methanolic potassium hydroxide solution for 1 g. of the steroid. The mixture was then neutralized with acetic acid, concentrated under reduced pressure, diluted with water and the precipitate was collected by filtration and purified by recrystallization from acetone-hexane.

A solution of 5 g. of the 16α,17α-acetonide of 6-chloro - 9α - fluoro - 3 - ethoxy-Δ$^{3,5}$-pregnadiene-16α,17α,21-triol-11,20-dione in 50 cc. of pyridine was treated with 3 cc. of methanesulfonyl chloride at 0° C. and kept overnight at this temperature, then poured into ice water and the precipitate was collected, washed with water and dried. There was thus obtained the 21-mesylate of the 16α,17α - acetonide of 6 - chloro-9α-fluoro-3-ethoxy-Δ$^{3,5}$-pregnadiene-16α,17α,21-triol-11,20-dione, which was used for the next step without further purification.

A solution of the above compound in 200 cc. of acetone was mixed with 3 g. of sodium iodide and refluxed for 2 hours. Most of the acetone was then removed by distillation, the residue was diluted with water and the precipitate was collected, washed with water and dried. There was thus obtained the 16α,17α-acetonide of 6 - chloro - 9α - fluoro - 21 - iodo - 3 - ethoxy - Δ$^{3,5}$-pregnadien-16α,17α-diol-11,20-dione in crude form, which was dissolved in 200 cc. of methanol and 20 cc. of water; 5 cc. of sodium bisulfite was added and the mixture was refluxed for 2 hours. Most of the methanol was removed by distillation under reduced pressure, the residue was diluted with water and the precipitate was collected, washed with water and then treated with 2 cc. of concentrated hydrochloric acid in 200 cc. of glacial acetic acid, kept at room temperature for 2 hours and diluted with ice water. There was thus obtained the 16α,17α-acetonide of 6α-chloro-9α-fluoro-Δ$^4$-pregnene-16α,17α-diol-3,11,20-trione which was purified by recrystallization from acetone-hexane.

A mixture of 1 g. of the above compound, 2 g. of chloranil, 25 cc. of ethyl acetate and 5 cc. of glacial acetic acid was refluxed under an atmosphere of nitrogen for 72 hours; the cooled mixture was washed with aqueous 10% sodium hydroxide solution until the washings were colorless, dried over anhydrous sodium sulfate and the ethyl acetate evaporated. Chromatography of the residue on neutral alumina yielded the 16α,17α-acetonide of 6-chloro-9α-fluoro-Δ$^{4,6}$ - pregnadiene - 16α,17α-diol-3,11,20-trione.

A mixture of 500 mg. of the above compound, 300 mg. of selenium dioxide, 20 cc. of t-butanol and a few drops of pyridine was refluxed for 18 hours under an atmosphere of nitrogen and then filtered through celite and diluted with water; the precipitate was collected, washed with water, dried and purified by chromatography on neutral alumina. There was thus obtained the 16α,17α-acetonide of 6-chloro - 9α-fluoro-Δ$^{1,4,6}$-pregnatriene-16α,17α-diol-3,11,20-trione.

1 g. of the 16α,17α-acetonide of 6α-chloro-9α-fluoro-Δ⁴-pregnane-16α,17α-diol-3,11,20-trione was subjected to the method of dehydrogenation with selenium dioxide described above, to produce the 16α,17α-acetonide of 6α-chloro-9α-fluoro - Δ¹,⁴-pregnadiene-16α,17α-diol-3,11,20-trione which was then subjected to the reaction with chloranil described above to furnish finally the 16α,17α-acetonide of 6-chloro - 9α-fluoro-Δ¹,⁴,⁶-pregnatriene-16α,17α-diol-3,11,20-trione, identical with the one produced by dehydrogenation of the Δ⁴-compound at C–6,7 and then at C–1,2.

EXAMPLE XIV

In accordance with the method described in the preceding example, there were prepared the 21-acetate of the 3-ethyl enol ether of the 16α,17α-acetonides of 6,9α-dichloro-16α-hydroxy - cortisone, 6-chloro-9α-fluoro-16α-hydroxy-hydrocortisone and 6,9α-dichloro-16α-hydroxy-hydrocortisone which were converted into the free 21-alcohols and subsequently into the corresponding 16α,17α-acetonides of 6α,9α-dichloro-Δ⁴-pregnene-16α,17α-diol-3,11,20-trione, of 6α-chloro-9α-fluoro-Δ⁴-pregnene-11β,16α,17α-triol-3,20-dione, of 6α,9α-dichloro-Δ⁴-pregnene-11β,16α,17α-triol-3,20-dione.

By treatment with selenium dioxide, as set forth in the preceding example, the latter compounds were transformed into the 16α,17α-acetonides of 6α,9α-dichloro-Δ¹,⁴ - pregnadiene - 16α,17α - diol - 3,11,20-trione, of 6α-chloro - 9α - fluoro - Δ¹,⁴-pregnadiene-11β,16α,17α-triol-3,20-dione and of 6α,9α-dichloro-Δ¹,⁴-pregnadiene-11β,16α,17α-triol-3,20-dione. By further treatment with chloranil as set forth in the preceding example, there were formed the 16α,17α-acetonides of 6,9α-dichloro-Δ¹,⁴,⁶-pregnatriene-16α,17α-diol-3,11,20-trione, of 6-chloro-9α-fluoro-Δ¹,⁴,⁶-pregnatriene-11β,16α,17α-triol-3,20-dione and of 6,9α - dichloro - Δ¹,⁴,⁶-pregnatriene-11β,16α,17α-triol-3,20-dione.

By treatment with chloranil and a mixture of ethyl acetate and acetic acid as described in Example XIII, the 16α,17α - acetonide of 6α,9α - dichloro-Δ⁴-pregnene-16α,17α-diol-3,11,20-trione, the 16α,17α-acetonide of 6α-chloro - 9α - fluoro - Δ⁴-pregnene-11β,16α,17α-triol-3,20-dione and the 16α,17α-acetonide of 6α,9α-dichloro-Δ⁴-pregnene - 11β,16α,17α - triol-3,20-dione were converted into the 16α,17α-acetonide of 6,9α-dichloro-Δ⁴,⁶-pregnadiene-16α,17α-triol-3,11,20-trione, the 16α,17α-acetonide of 6-chloro-9α-fluoro-Δ⁴,⁶-pregnadiene-11β,16α,17α-triol-3,20-dione and the 16α,17α-acetonide of 6,9α-dichloro-Δ⁴,⁶ - pregnadiene - 11β,16α,17α-triol-3,20-dione, respectively.

EXAMPLE XV

By substituting the 16α,17α-benzaldehyde acetal derivative of the starting materials in all of the preceding examples for the 16α,17α-acetonide derivative, there was obtained the corresponding cyclic 16α,17α-benzaldehyde acetal derivative of the products formed in all of the previous examples.

There may also be used other cyclic ketal and acetal derivatives of the starting compounds such as the 16α,17α-formaldehyde acetal, the 16α,17α-methyl-ethyl-ketal, the 16α,17α-acetaldehyde acetal, the 16α,17α-methyl-phenyl ketal to afford the corresponding 21-desoxy derivatives set forth in the preceding examples.

We claim:
1. A compound of the following formula:

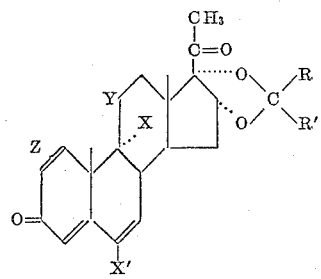

wherein Z is selected from the group consisting of a double bond between C–1 and C–2 and a saturated linkage between C–1 and C–2; X and X' are each selected from the group consisting of fluorine and chlorine; Y is selected from the group consisting of keto and β-hydroxy; and R and R' are each selected from the group consisting of hydrogen and a hydrocarbon radical containing up to 8 carbon atoms.

2. The 16α,17α-formaldehyde acetal of 6-fluoro-9α-chloro-Δ⁴,⁶-pregnadiene-16α,17α-diol-3,11,20-trione.

3. The 16α,17α-acetonide of 6,9α-difluoro-Δ⁴,⁶-pregnadiene-11β,16α,17α-triol-3,20-dione.

4. The 16α,17α-acetonide of 6-chloro-9α-fluoro-Δ⁴,⁶-pregnadiene-11β,16α,17α-diol-3,20-dione.

5. The 16α,17α-acetonide of 6,9α-dichloro-Δ⁴,⁶-pregnadiene-16α,17α-diol-3,11,20-trione.

6. The 16α,17α-benzaldehyde acetal of 6,9α-difluoro-Δ¹,⁴,⁶-pregnatriene-16α,17α-diol-3,11,20-trione.

7. The 16α,17α-methyl-ethyl-ketal of 6-fluoro-9α-chloro-Δ¹,⁴,⁶-pregnatriene-11β,16α,17α-triol-3,20-dione.

8. The 16α,17α, - acetonide of 6 - chloro - 9α - fluoro-Δ¹,⁴,⁶-pregnatriene-16α,17α-diol-3,11,20-trione.

9. 16α,17α - lower alkylidenedioxy-6,9α-dichloro-Δ⁴,⁶-pregnadiene-11β-ol-3,20-dione.

10. 16α,17α - lower alkylidenedioxy - 6,9α - difluoro-Δ⁴,⁶-pregnadiene-11β-ol-3,20-dione.

11. 16α,17α - lower alkylidenedioxy - 6,9α - difluoro-Δ⁴,⁶-pregnadien-3,11,20-trione.

12. 16α,17α - lower alkylidenedioxy - 6 - chloro - 9α-fluoro-Δ⁴,⁶-pregnadien-3,11,20-trione.

13. 16α,17α - lower alkylidenedioxy - 6 - fluoro - 9α-chloro-Δ⁴,⁶-pregnadiene-11β-ol-3,20-dione.

14. 16α,17α - lower alkylidenedioxy - 6,9α - difluoro-Δ¹,⁴,⁶-pregnatriene-11β-ol-3,20-dione.

15. 16α,17α - lower alkylidenedioxy - 6 - fluoro - 9α-chloro-Δ¹,⁴,⁶-pregnatriene-11β-ol-3,20-dione.

16. 16α,17α - lower alkylidenedioxy - 6,9α - dichloro-Δ¹,⁴,⁶-pregnatriene-11β-ol-3,20-dione.

17. 16α,17α - lower - alkylidenedioxy - 6 - chloro -9α-fluoro-Δ¹,⁴,⁶-pregnatriene-11β-ol-3,20-dione.

18. The 16α,17α - acetonide of 6,9α - difluoro - Δ¹,⁴,⁶-pregnatriene-11β,16α,17α-triol-3,20-dione.

19. The 16α,17α - acetonide of 6 - fluoro - 9α - chloro-Δ¹,⁴,⁶-pregnatriene-11β,16α,17α-triol-3,20-dione.

No references cited.

LEWIS GOTTS, *Primary Examiner.*

MORRIS LIEBMAN, LESLIE H. GASTON, IRVING MARCUS, *Examiners.*